United States Patent
Carriero et al.

(10) Patent No.: US 9,129,259 B2
(45) Date of Patent: Sep. 8, 2015

(54) PAGES: HUB STRUCTURE FOR RELATED PAGES

(75) Inventors: Thomas Giovanni Carriero, Menlo Park, CA (US); Jeffrey Andrew Kanter, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/312,912

(22) Filed: Dec. 6, 2011

(65) Prior Publication Data

US 2013/0144948 A1 Jun. 6, 2013

(51) Int. Cl.
G06F 15/16 (2006.01)
G06Q 10/10 (2012.01)
G06F 17/00 (2006.01)
G06F 17/30 (2006.01)
G06Q 50/00 (2012.01)
G06Q 30/02 (2012.01)

(52) U.S. Cl.
CPC ............. *G06Q 10/101* (2013.01); *G06F 17/00* (2013.01); *G06F 17/3089* (2013.01); *G06Q 50/01* (2013.01); *G06Q 30/02* (2013.01)

(58) Field of Classification Search
CPC ..... G06F 17/3089; G06F 17/00; G06Q 30/02; G06Q 50/01; G06Q 10/101
USPC ........................................................ 709/204
See application file for complete search history.

(56) References Cited

U.S. PATENT DOCUMENTS

| | | | |
|---|---|---|---|
| 6,938,260 B1 * | 8/2005 | Wason | 719/316 |
| 7,853,881 B1 * | 12/2010 | Aly Assal et al. | 715/734 |
| 8,311,950 B1 * | 11/2012 | Kunal et al. | 705/319 |
| 8,326,770 B1 * | 12/2012 | Weisman | 705/319 |
| 8,417,713 B1 | 4/2013 | Blair-Goldensohn et al. | |
| 8,499,247 B2 | 7/2013 | Niyogi et al. | |
| 8,606,792 B1 | 12/2013 | Jackson et al. | |
| 8,732,240 B1 * | 5/2014 | Tomkins et al. | 709/204 |
| 8,751,917 B2 * | 6/2014 | Dhawan et al. | 715/204 |
| 2006/0161564 A1 * | 7/2006 | Pierre et al. | 707/100 |
| 2008/0102856 A1 * | 5/2008 | Fortescue et al. | 455/456.1 |
| 2008/0228761 A1 * | 9/2008 | Kei Leung et al. | 707/5 |
| 2008/0294663 A1 | 11/2008 | Heinley et al. | |
| 2009/0106307 A1 * | 4/2009 | Spivack | 707/103 R |
| 2009/0217178 A1 | 8/2009 | Niyogi et al. | |
| 2009/0327338 A1 * | 12/2009 | Zhao et al. | 707/103 R |
| 2010/0042511 A1 * | 2/2010 | Sundaresan et al. | 705/26 |
| 2010/0121790 A1 * | 5/2010 | Klinkott | 706/12 |
| 2010/0174709 A1 * | 7/2010 | Hansen et al. | 707/728 |
| 2011/0040586 A1 * | 2/2011 | Murray et al. | 705/7 |
| 2011/0113349 A1 * | 5/2011 | Kiciman et al. | 715/753 |
| 2011/0145064 A1 * | 6/2011 | Anderson et al. | 705/14.53 |
| 2011/0153666 A1 * | 6/2011 | Flynn et al. | 707/779 |
| 2011/0264532 A1 * | 10/2011 | Chan et al. | 705/14.66 |

(Continued)

OTHER PUBLICATIONS

Glover, Eric, "Inferring Hiearchial Descriptions," Nov. 2002, ACM, p. 507-514.*

(Continued)

*Primary Examiner* — Michael Pyzocha
(74) *Attorney, Agent, or Firm* — Fenwick & West LLP

(57) ABSTRACT

Pages are created in a social network for a topic of interest and are organized and connected to each other based on related topics or categories. Relationships between parent pages and child pages are created based on the same or related topic of interest. Pages in the same category can also be connected. Information is shared among related pages in the social network.

26 Claims, 6 Drawing Sheets

(56) References Cited

U.S. PATENT DOCUMENTS

| | | |
|---|---|---|
| 2011/0270850 A1 | 11/2011 | Wana et al. |
| 2011/0270922 A1* | 11/2011 | Jones et al. .................. 709/204 |
| 2011/0289171 A1* | 11/2011 | Gross ............................ 709/206 |
| 2012/0084133 A1* | 4/2012 | Ross et al. ................. 705/14.27 |
| 2012/0290446 A1 | 11/2012 | England et al. |
| 2012/0303702 A1* | 11/2012 | Richter et al. ................ 709/204 |
| 2013/0073382 A1* | 3/2013 | Henkin et al. ............. 705/14.49 |
| 2013/0117281 A1* | 5/2013 | Fleet et al. .................... 707/748 |
| 2013/0117284 A1 | 5/2013 | Roozen et al. |
| 2013/0138644 A1 | 5/2013 | Yahia et al. |
| 2013/0139048 A1* | 5/2013 | Dhawan et al. ............... 715/234 |
| 2013/0297623 A1 | 11/2013 | Niyogi et al. |

OTHER PUBLICATIONS

Shinjo, Y., "Collaboration by Passing Access Rights for Personal Protected Web Resources," 2010, IEEE, p. 1-10.*

Vargas Rigo, F., "Smart Saint: An Active Semi-Supervised Learning Internet Filter," 2013, IEEE, p. 136-142.*

Yang, Christopher et al., "A Study on the User Navigation Path of Web-Based Intervention Program," Nov. 2010, ACM, p. 449- 453.*

\* cited by examiner

PAGES: HUB STRUCTURE FOR RELATED PAGES

BACKGROUND

1. Field

This disclosure relates generally to structuring and connecting pages in a social networking environment.

2. Description of the Related Art

Web pages in a social network can be dedicated to a topic of interest, such as a brand or product, an activity, a public figure or a celebrity, a business, or a location. Users can create and manage pages in the social network. A user can create a page by selecting a topic of interest and adding information to the page about the topic. Users can also check-in to a location and by doing so, create a page for the location in the social network. For instance, a user can check-in at a local Starbucks coffee shop and create a page for that particular Starbucks location. Other users can create different pages for various Starbucks locations.

Pages can be created that relate to the same topic of interest, such as a product, business, or public figure. Conventionally, pages with similar content or topic of interest are not connected to each other or related in the social network. Moreover, each time a page is created, new information must be submitted, such as the name and details about the business, product, or location.

It can also be confusing for users when searching through multiple pages for the same or related topics of interest. If a user is searching for a page for a business, it can be difficult to determine which page is the main page or which one is authentic among multiple pages created for the same business. Also, if a company has numerous locations, a user can become confused as to which page is the central business page for the company and which pages are for individual locations.

SUMMARY

Pages are created that are dedicated to a topic of interest. Connections are established among related pages in the social networking system. When a page is created, one or more related pages are identified and connected to the new page. A related page that is designated as the central or main page for a topic of interest is called the parent page. The parent page can be connected to child pages that have the same topic of interest but are intended for individual locations, products, businesses, sub-groups, or other related sub-topics. Child pages can also be connected to each other. Hierarchies of parent and child relationships can be formed, and pages can also be grouped and connected based on similar categories. The connections form an organizational hub structure of pages in the social network. Information can be shared among related pages within the hub structure.

Figure 1:
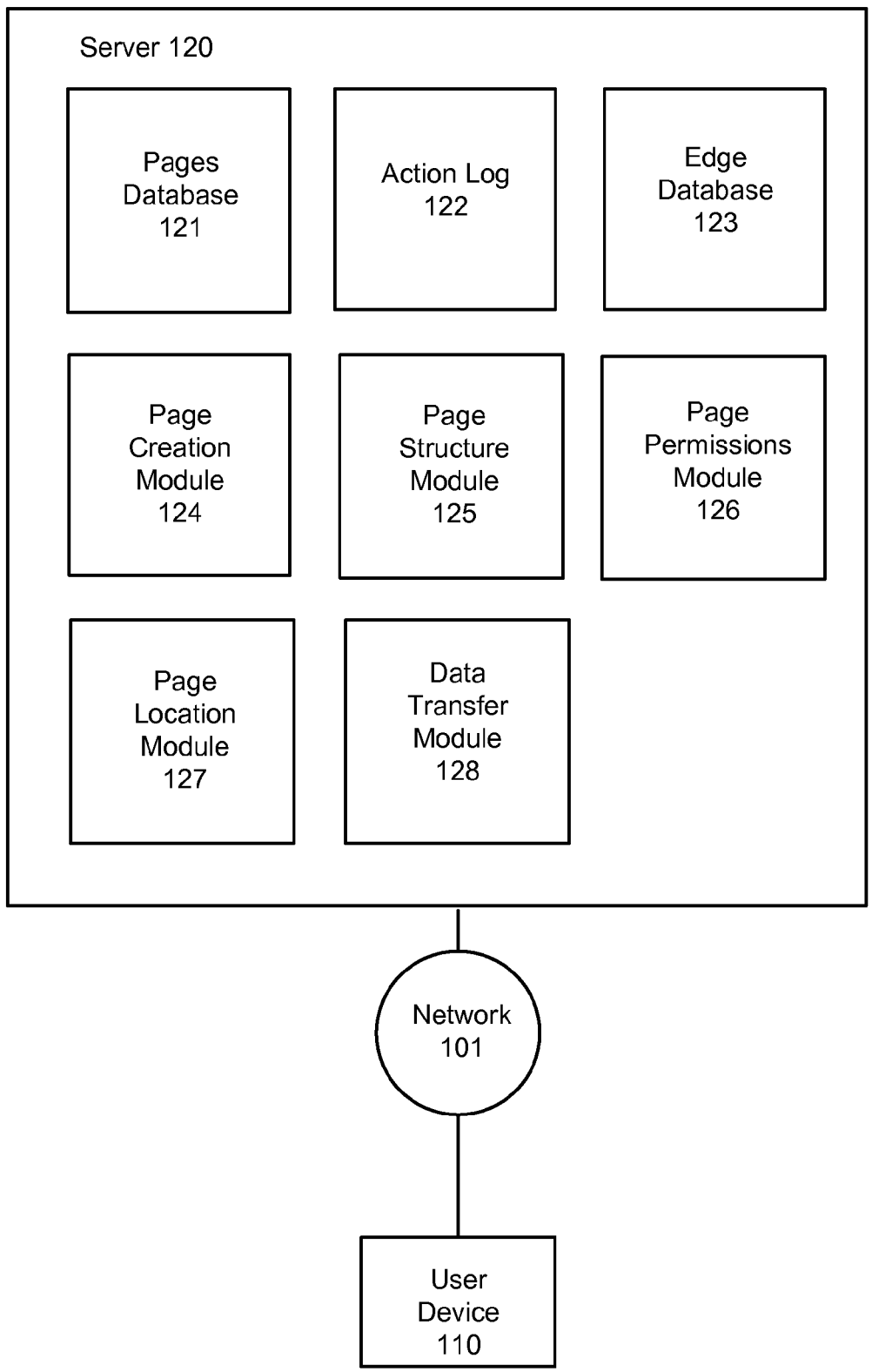
FIG. 1 is a high-level block diagram of a system environment, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Described embodiments provide systems, methods, and computer readable storage media for connecting and structuring pages in an online social network.

An online social network provides users a way to connect and communicate with other users. Social networks allow users to establish relationships or connections with others and share information in a variety of useful ways. A user is a person who has an account in the social network and establishes connections with other users, groups, or organizations via the social network.

Pages in an online social network are dedicated to a topic of interest. A topic of interest can include, for example, a business or company, a place of interest or a geographic location, a brand or a product, a private or public figure, a form of entertainment (e.g., music, sports, activities, movies, etc.), a cause or a community, or any other category. The page provides a forum for users who have a collective interest in the topic.

An administrator ("admin") is a type of user who can create and/or manage the page. The admin can control the content and look of the page. In some embodiments, a user with an account in the social network can create and/or manage a page. In other embodiments, a user who represents a corporate or business entity, group, or organization can create and manage a page.

On a given page, users can post comments, pictures, links, videos, media, or other content on the page. Users can also add comments or an expression of interest ("like") to other posts on the page. For instance, a user can "like" another user's comment or "like" a page. When a user "likes" a page, he or she joins a community of other users who like the topic of interest and are connected to the page. A page can also include text, comments, photos, advertisements, logos or trademarks, location information, product information, marketing materials, URL links, information about deals or promotions, other related products, or upcoming events, etc.

Multiple pages can be created for a topic of interest. A page can be created for various locations of a business. For example, a page can be created for each of the over 17,000 Starbucks stores in the world. In another example, a page can be created for different products from the same company (e.g., Cherry Coca-Cola, Diet Coke, etc.) or various subgroups of a larger group or community (e.g., San Francisco Democratic Party, Chicago Democratic Party, etc.). Numerous pages can also be created by users who have an interest in a public figure, sporting activity or sports team, musician or entertainer, or other popular topic of interest (e.g., multiple fan pages for Justin Bieber created by different users).

System Architecture

FIG. 1 is an illustration of a system environment 100 in accordance with one embodiment of the invention. The system environment 100 includes a network 101 one or more user devices 110, and a server 120.

The network 101 represents the communication pathway between the server 120 and the user device 110. In one embodiment, the network 101 is the Internet and uses standard communications technologies and/or protocols. The network 101 can also utilize dedicated, custom, or private communications links that are not necessarily part of the Internet. The network 101 may comprise any combination of local area and/or wide area networks, using both wired and wireless communication systems.

The user device 110 can be a desktop computer, laptop computer, portable computer, personal digital assistant (PDA), smart phone, or any other device including computing functionality and data communication capabilities. A plurality of user devices 110 can be configured to communicate via the network 101.

The server 120 comprises a pages database 121, an action log 122, an edge database 123, a page creation module 124, a page structure module 125, a page permissions module 126, a page location module 127, and a data transfer module 128.

The pages database 121 stores data about each page in the social network. The pages database 121 stores data about the content and layout of a page, including photos, links, objects, or posts that are associated with and displayed on the page. The pages database 121 can also store information about the location, number of check-ins or likes, number of visits, or number of tips or comments on the page.

The action log 122 stores data about actions taken by users with a page. For instance, if a user comments on a post on a page, the action log 122 stores the actions between the user and the page. The action log 122 can also store the actions between different users who add comments to or like posts of another user on a page.

The edge database 123 stores data about the connections between pages of the social network. A connection between two pages is called an edge. In one embodiment, the edge database 123 stores the connections between a parent page and one or more child pages in the social network. The edge database 123 can store a plurality of edges established among related pages. For example, a parent page for "Starbucks" can be connected to thousands of child pages for individual Starbucks locations.

A new page is created when the page creation module 124 receives a request from a user (or an admin) to create a new page in the social network. The request can be activated by a user's check-in to a particular location or business. A new page request can also be submitted when a user clicks on a "create a new page" link or similar type of link in the social networking environment. The page creation module 124 can respond to the user and require the user to submit additional information about the topic of interest, such as a name, a category, a sub-category, a photo, a website, a location or an address, etc. This information can be submitted by the user from the user device, such as a computer, a smart phone, etc. The page creation module 124 can create a page using the information submitted by the user. The page creation module 124 can also submit information about the new page for storage in the pages database 121 and pass the data along to the page structure module 125 for processing.

The page structure module 125 determines the relationship between pages. The page structure module 125 can determine the relationship between a new page and existing pages, or between existing pages in the social network.

The page structure module 125 can determine that a relationship between two pages is a parent-child relationship. Pages are structured hierarchically as parent pages and child pages. A connection between a parent page and a child page is called an edge. A parent page is dedicated to a topic of interest and is designated as the central or main page in a hub structure of related pages. The parent page includes information that is common to the related child pages and can be used as an organizational page for connecting and categorizing other pages. A child page includes the same or related topic of interest as the parent page, and the topic of interest can be a sub-category or sub-group of the parent page. Some examples of parent page-child page connections include the following: the child page "is a store of" the parent page, the child page "is a product of" the parent page, the child page "is a representative of" the parent page, the child page "is sold at" the parent page, the child page "is a book by" the parent page, or the child page "is a movie by" the parent page.

Other types of edges can be established between pages. Child pages that have the same or related topic of interest can be connected in a horizontal relationship (e.g., "sibling" relationships). In one example, pages for individual Starbucks store locations can be connected to each other because they fall under the same category of business. Pages can be structured such that a page has a hierarchical relationship with more than one page (e.g., a page can be designated as a child page in relationship to a parent page and also designated as a parent page to a second child page). For instance, a parent page for the "Disney" company could be connected to a child page for the theme park, "Disneyland." The "Disneyland" page can be designated as a parent page to a child page for the "Magic Mountain" ride at Disneyland. The "Disney" page could be called the grand-parent page to the "Magic Mountain" page. This organization among pages can result in a hierarchal structure of connections.

Figure 2:
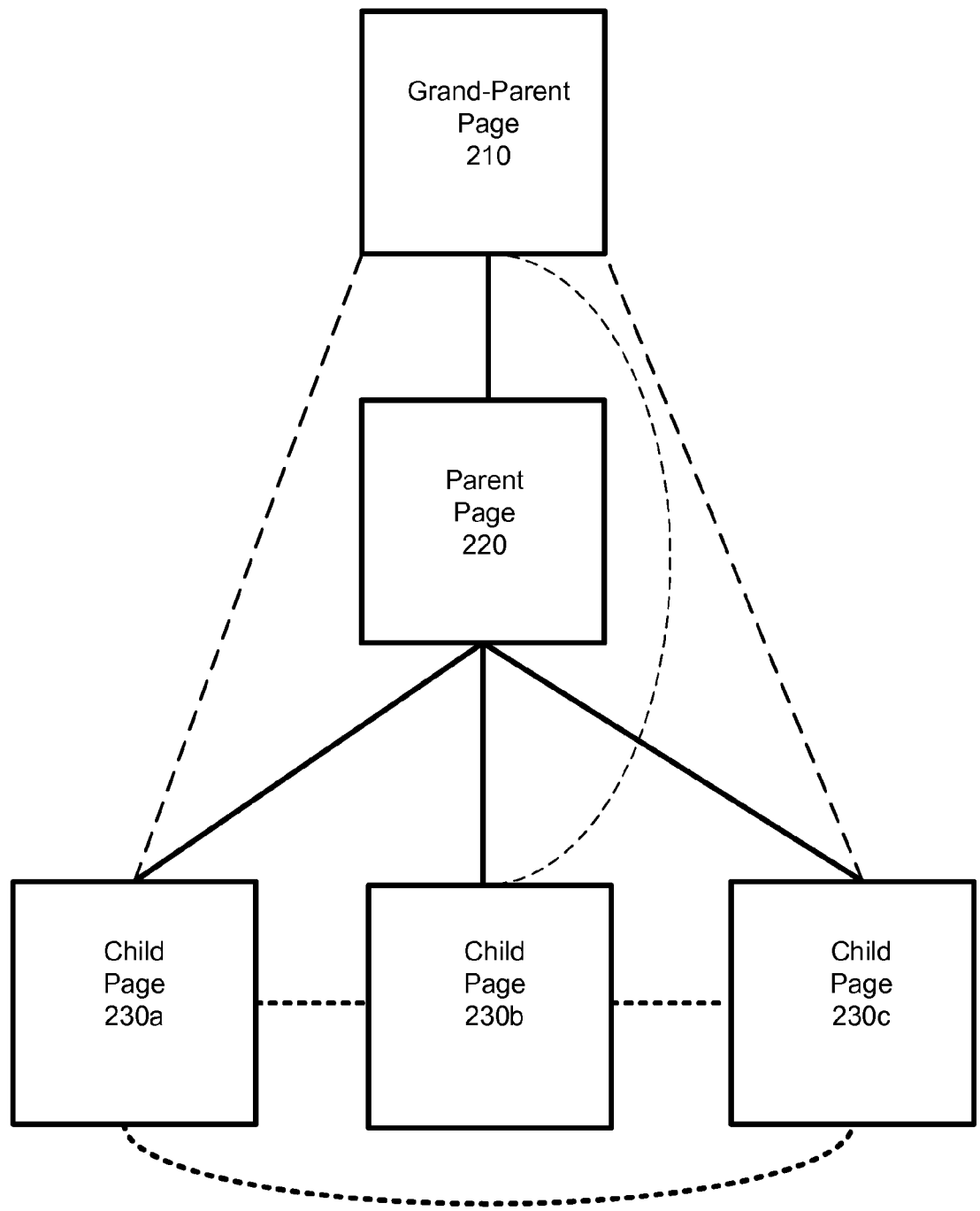
FIG. 2 is a high-level block diagram of an example of a page hub structure in a social network, in accordance with an embodiment of the invention.

FIG. 2 illustrates an example of a hub structure among related pages in a social network. A grand-parent page 210 has an edge with a related parent page 220 and child pages 230a, 230b, and 230c. The parent page 220 also shares edges with the child pages 230a, 230b and 230c. The child pages 230a, 230b and 230c can share edges with each other. Numerous other configurations of edges and relationships among pages can be defined and structured according to the embodiments of the invention.

The hub structure of pages allows for a sharing of data and information among pages. Permissions can be designated based on the relationships among various pages. The page permissions module 126 can verify and set permissions for pages to share data about the topic of interest. For example, a page that is structurally higher in the hierarchical structure (parent or grand-parent page, etc.) can have administrative permissions to edit, create, share, or manage information on other child pages.

Figure 3:
FIG. 3 is a high-level block diagram of example categories of pages in a social network, in accordance with an embodiment of the invention.

The page structure module 125 can also categorize pages, and the categories can be used to determine the relationships among pages. The page structure module 125 can determine the relationship of a page to other pages based on the categorization of the page. FIG. 3 illustrates examples of categories for pages: a local business or place 310, a company, organization or institution 320, a brand or product 330, an artist, band or public figure 340, entertainment 350, or a cause or community 360. Pages that fall within the same category or sub-category can be grouped together and can be connected to each other.

In some embodiments, the pages can be categorized based on a similar geographic location. Pages can be grouped together based on the location of the topic of interest (e.g., pages for Chicago sports teams, pages for bars in the Mission district of San Francisco). For example, location-based categorization can be useful for connecting pages that are associated with the same cities or countries (for example, categorizing Dunkin' Donuts stores located in the U.S. in one category, and Dunkin' Donuts stores located in Korea in another category).

Referring back to FIG. 1, the page structure module 125 can also determine the relationship between pages by requesting the user to define a relationship. This prompt can be sent at the time that the page is created or after the user has created the page. The request to define edges can be provided through a user interface in the social network or via an API (application programming interface). The user can define the page as a parent page, a child page, or a grand-parent page, for example. The user can designate multiple relationships with other pages. The page structure module 125 can also ask the user to select a geographic location for the page, such as the city or country (e.g., Starbucks U.K. or Starbucks U.S.).

In some embodiments, the page structure module 125 requests the user to designate a category for the page in order to define the relationship of the page to other pages. The page structure module 125 can also request the user to select sub-categories. For instance, sub-categories for a business or place can include bookstores, grocery stores, hotels, landmarks, or schools. The page structure module 125 can ask for additional information about the sub-category, such as the name, address, or phone number of the business or place of interest.

In other embodiments, the page structure module 125 can infer the relationship between pages. In one embodiment, related pages can be inferred based on the content of the page. The page structure module 125 can analyze the content on the page. The page structure module 125 determines based on the content whether the page is similar in content to an existing parent page or child page. For instance, if a page has frequent occurrences of the words "Coca-Cola" on the page, the page is likely to be related to other pages about "Coca-Cola." In another example, the page structure module 125 can infer the relationship of the pages by analyzing the content of posts on the page. For example, if a page has multiple posts about Starbucks coffee, it is likely to be related to a parent Starbucks page.

The relationship among pages can also be inferred by a user's actions associated with the page. In some embodiments, a user's posts are used to infer the category of the page, which can then be used to determine its relationship to other pages. A user's post may include content about the topic of interest or refer to a subject matter that is shared with another child page or a parent page. For example, a new page that has posts about the San Francisco Giants can be inferred to be related to a parent page or other child pages about the San Francisco Giants.

In some embodiments, a user's check-in location can be used to categorize the page and/or determine a relationship with other pages. Pages with a similar topic of interest and location can be used to establish a connection between the pages. For example, a user may check into a location for a restaurant that is near other known locations for restaurants in the Mission district of San Francisco. The page structure module 125 can categorize the page with other pages for Mission district restaurants and connect those pages via edges based on the similar location and category.

In one embodiment, the time of a user's check-in can be used to categorize the page and/or determine a relationship with other pages. The page structure module 125 can analyze the check-in times for multiple users to determine whether a page is for a particular kind of establishment or business. For example, if multiple users check-in to a location around 2 A.M., the page structure module 125 can infer that the page is for a bar or late-night establishment that is open at that time.

The page structure module 125 can also present structured questions to users to determine the category of the page and possible relationships with other pages. The data collected from the structured user questions can be used to identify the type of page and determine the categories of pages. Questions can be presented when the user is creating or editing a page, or when the user is performing other actions in the social network (e.g., playing games, checking-in to a location). The answers to the questions can be used to gather information about the topic of the page (e.g., locations or products) and to determine the category of the page. For instance, the following question can be presented to a user: "What is your favorite bar in Palo Alto, Calif.?" The answers provided by the user are presumed to only include names of bars. The names of the bars can be used to determine whether a particular page has a name that matches names of identified bars in Palo Alto and whether the page should be categorized with other bars located in Palo Alto.

In other embodiments, the page structure module 125 can determine the relationship among pages using a machine learning algorithm. Various data are input as signals and analyzed by the machine learning algorithm. The signals can include the average, median, skew, and kurtosis from a histogram of the data set. A machine learning algorithm can be trained on a set of signals associated with the data from a page that has been verified to have a connection with an existing page (e.g., a verified relationship between a child page and a parent page). The machine learning algorithm can be adjusted using various rules and coefficients to accurately predict whether a page is a child page of a parent page. Once the machine learning algorithm has been trained on a known data set, the algorithm can be used for determining whether other pages should be designated as child pages for a parent page. Data can also be used to train the machine learning algorithm to determine whether a page is in the same category as other pages or should be connected to other child pages.

The page structure module 125 can also determine how to categorize pages based on crowdsourcing methods. Crowdsourcing is the act of outsourcing tasks, traditionally performed to a large group of people or community (a crowd), through an open call, and typically involves asking users who are otherwise unconnected to produce data or assist in decision making. Data collected from these unconnected users can be used to categorize and structure relationships among pages. For instance, the page structure module 125 can gather data from multiple users about a certain topic of interest or category. In one example, users can be asked for recommendations for a restaurant in a particular area. The page structure module 125 can analyze the reputation of the users who provide the answers to verify whether the recommendations should be considered. This verification can be done by assessing the users' other actions in the social network and determining whether these actions show that they are trustworthy users. For example, a user who has engaged in spamming other users or providing wrong answers to structured questions would not be considered trustworthy. Next, an independent verification can be performed to determine whether the recommended restaurants are existing restaurants and have had similar independent ratings. Verified pages with good recommendations can be categorized together and edges can be created among these pages. Various other types of crowd-sourcing techniques can be used to gather data about pages and to categorize pages.

For a designated parent page, the page location module 127 can create child pages from the parent page for various geographical locations of the viewing users. For example, the page location module 127 can configure a page for a non-real world entity based on the geographic location (e.g., Starbucks U.K.) using a page of a real world entity (e.g., Starbucks). The parent page for Starbucks can be configured and presented as a Starbucks U.K. page for a viewing user in London, and the same page can be presented as a Starbucks U.S. page for a viewing user in New York. The page location module 127 can create child pages based on geographic locations for numerous parent pages in the social network.

Figure 4:
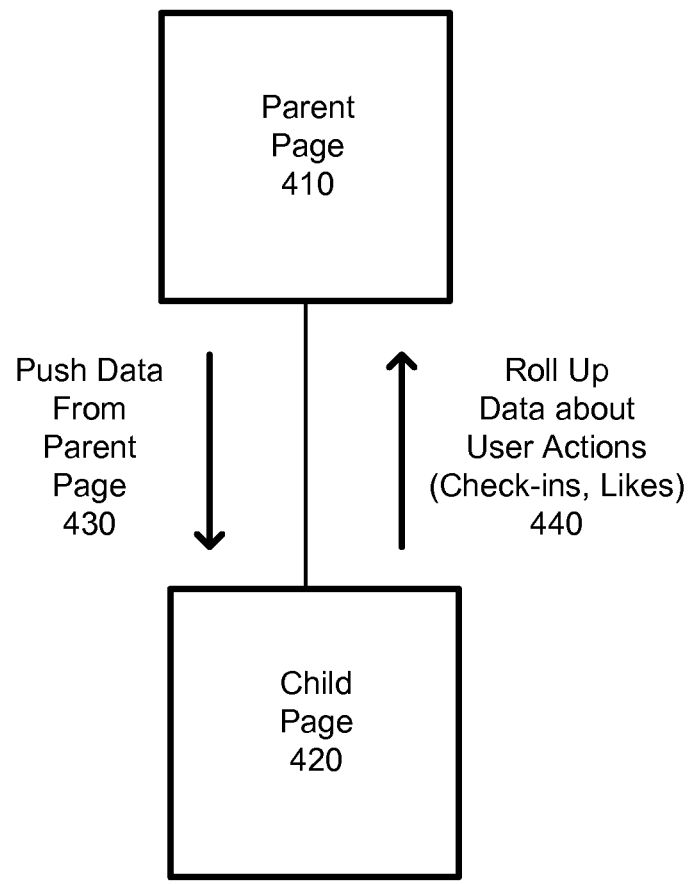
FIG. 4 is an example of a parent page and a child page in a social network, in accordance with an embodiment of the invention.

In addition, the data transfer module 128 transfers data between the parent page and the child page. Referring now to FIG. 4, an example is shown where a child page 420 is created or connected to a parent page 410, and the data transfer module 128 "pushes down" 430 data about the topic of interest from the parent page 210. This data can include text, posts, tips, comments, objects, photos, links, address or location information, promotional or marketing information, or information about the topic of interest. The data transfer module 128 can also "roll up" 440 data from the child page 420 to the parent page 410. In some embodiments, data can be rolled up from multiple child pages 420 and sent to the parent page 410. This data can include the aggregate number of likes, check-ins or users' actions associated with all of the child pages 420.

Figure 5:
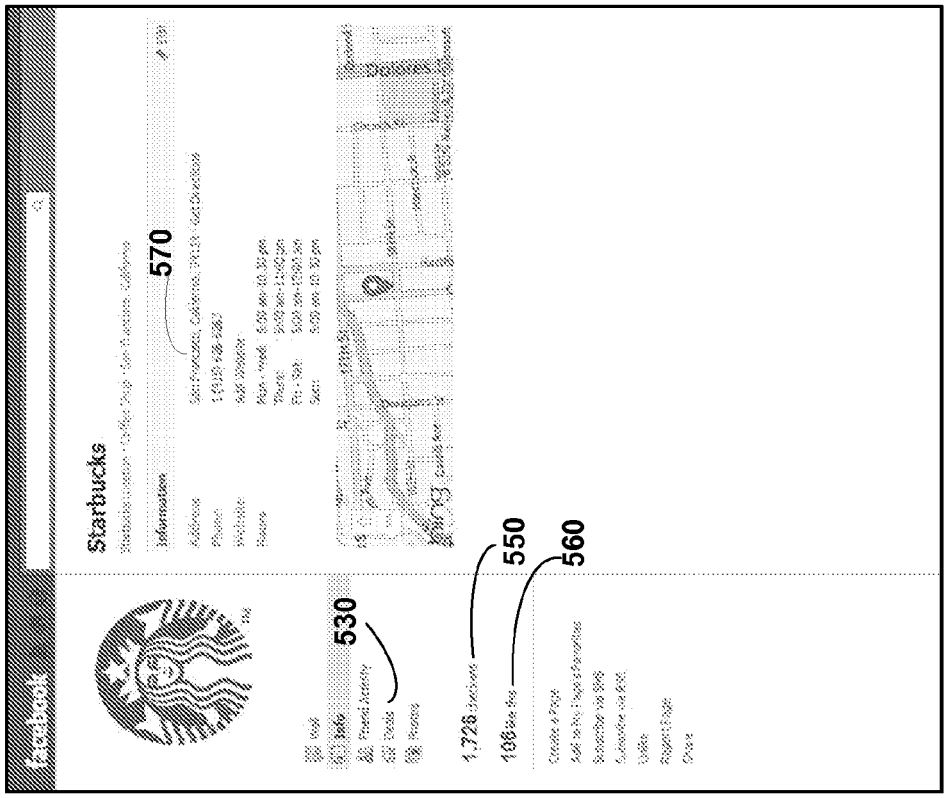
FIG. 5 is an example of a parent page and a child page in a social network, in accordance with an embodiment of the invention.
Figure 5:
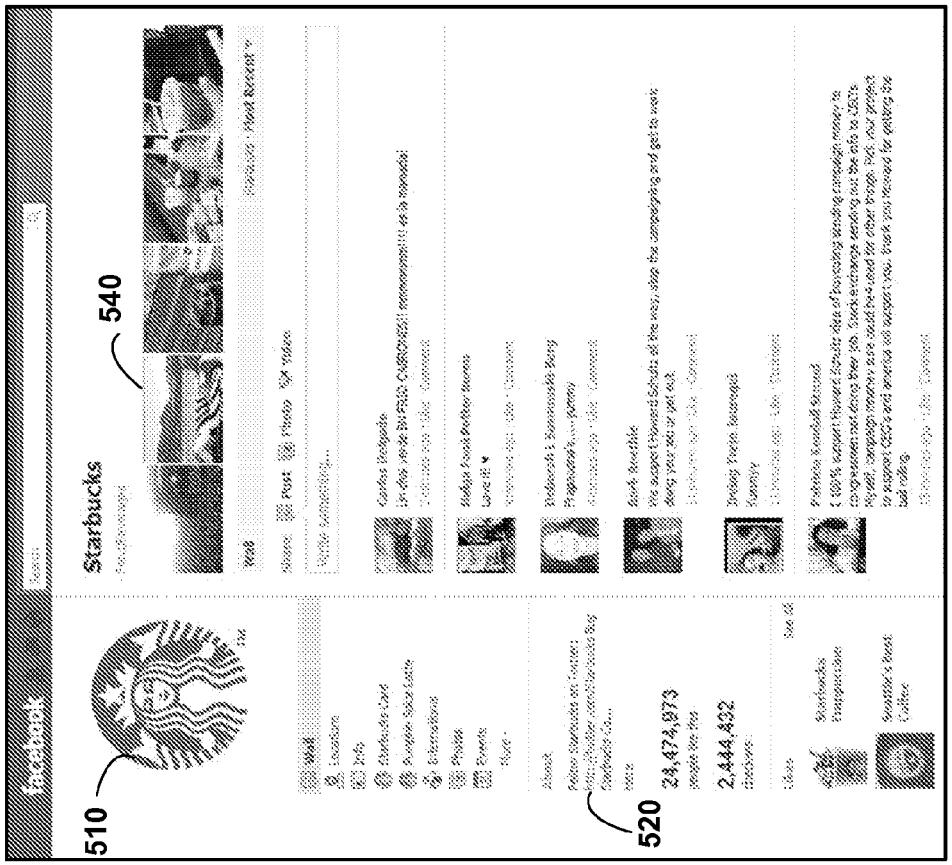

FIG. 5 shows an example where data has been pushed down 430 from a Starbucks parent page 410 to a Starbucks child page 420. This data can include the Starbucks logo 510, the Starbucks website 520 (or related websites), promotional deals 530, or photos 540. An example of data that can be rolled up to the parent page is also shown in FIG. 5. The rolled up data can include the number of check-ins 550, number of likes 560, or location information 570, etc. The number of check-ins 550 or likes 560 from the Starbucks child page 410 can be added to the data about check-ins and likes on the Starbucks parent page 410. The location 570 of the child page 420 could also be added to the various store locations associated with the parent page 410. In some embodiments, actions of a user's friends that are associated with a page can be transferred among other related pages. Various other types of data can be transferred among related pages in the social network.

Figure 6:
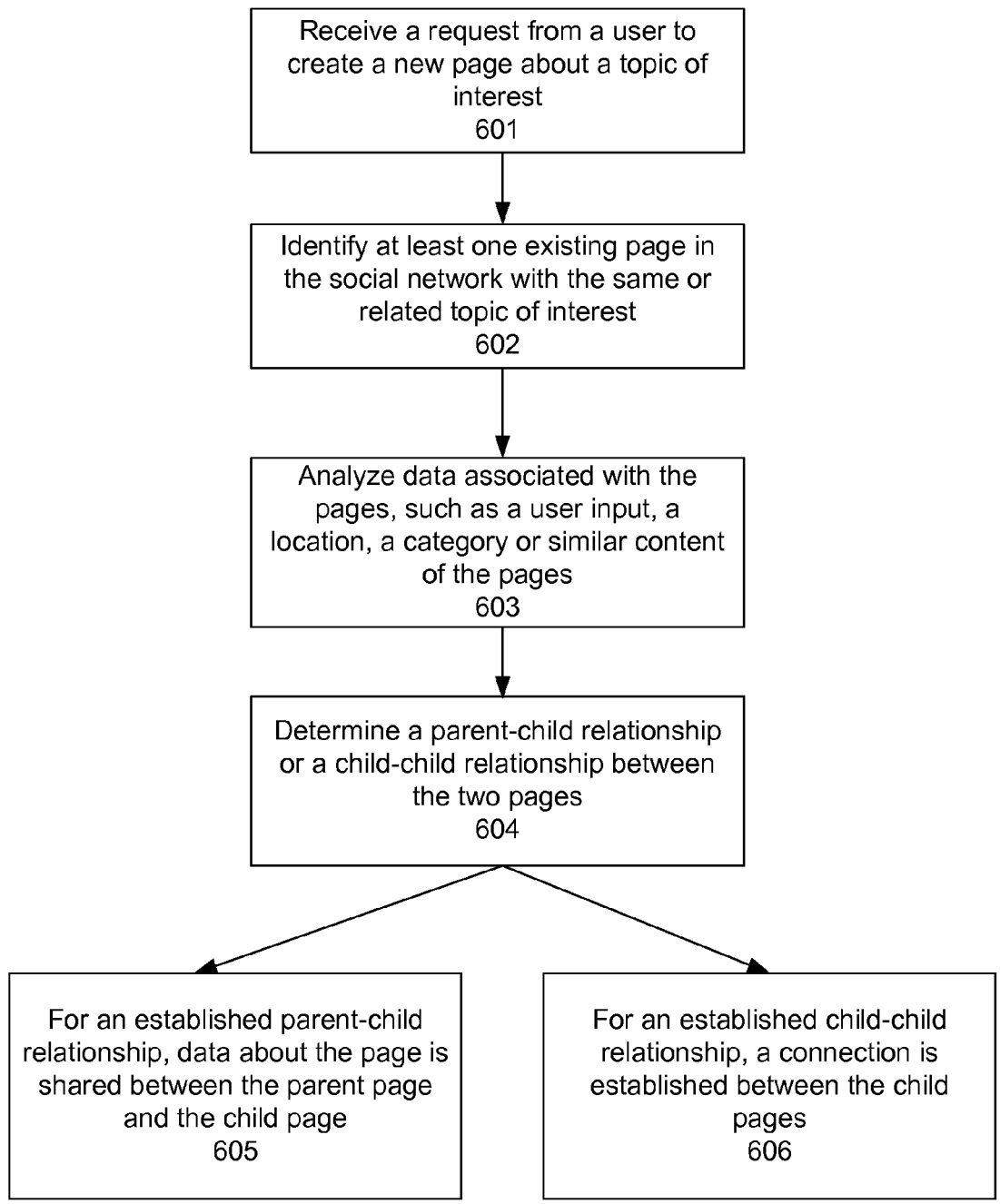
FIG. 6 is a flow chart that illustrates a method of structuring pages in a social network, in accordance with an embodiment of the invention.

FIG. 6 is a flow chart that illustrates an exemplary method of structuring pages. The social network system receives 601 a request from a user to create a new page about a topic of interest. The system identifies 602 at least one existing page in the social network that includes the same topic of interest or a related topic of interest. The data associated with the pages are analyzed 603, which includes data from a user's input (actions by the user with the page, submitted information by the user about the page, answers to questions about the page), a location, a category, or similar content of the pages, for example. A parent-child relationship or a child-child relationship is determined 604 between the two pages and connections are established between the pages. For an established parent-child relationship, data is shared 605 between the parent page to the child page. Data can be rolled-up from the child page to the parent page or pushed-down from the parent page to the child page. For an established child-child relationship, a connection is established 606 between the child pages.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising:
obtaining training data that defines mappings between social networking content associated with social networking pages and between entities corresponding to those social networking pages;
accessing a child page in a social networking system, the child page containing content that is associated with a child entity in the social networking system;
identifying a parent page containing content that is associated with a parent entity in the social networking system;

determining, by a computer, that a parent-child relationship exists between the parent and child entities, by:
retrieving a post displayed on the child page,
identifying one or more terms contained in the retrieved post,
comparing, via a machine learning model that is trained using the previously obtained training data, the retrieved one or more terms contained in the post on the child page with the content contained on the identified parent page, and
based on the comparing, determining that a parent-child relationship exists between the parent and child entities;
responsive to the determining, establishing a connection in the social networking system between the child page and the parent page; and
associating at least a portion of the content of the parent page with the child page.

2. The method of claim 1, wherein determining that a parent-child relationship exists between the parent entity and the child entity comprises:
determining, based on the content of the child page that is associated with the child entity, that the child page is associated with a particular category; and
determining, based on the content of the parent page that is associated with the parent entity, that the parent page is associated with the same particular category.

3. The method of claim 1, wherein determining that a parent-child relationship exists between the parent entity and the child entity comprises statistically analyzing collective information obtained from a plurality of users associated with the child page to ascertain an association between the child entity and the parent entity.

4. The method of claim 1, wherein the content of the child page that is associated with the child entity comprises at least one of: a name of the child entity, a photo of the child entity, a link to a webpage associated with the child entity, a comment about the child entity, a user check-in associated with the child entity, a like expressing endorsement toward the child entity, and a location of the child entity.

5. The method of claim 1, further comprising updating the child page based on the portion of the content of the parent page associated with the child page, thereby displaying, on the child page, the portion of the content of the parent page.

6. The method of claim 1, further comprising associating at least a portion of content of the child page with the parent page.

7. The method of claim 6, further comprising updating the parent page based on the portion of the content of the child page associated with the parent page thereby displaying, on the parent page, the portion of the content of the child page.

8. The method of claim 7, wherein the portion of the content of the child page includes a number of likes associated with the child entity.

9. The method of claim 7, wherein the portion of the content of the child page includes a number of check-ins associated with the child entity.

10. The method of claim 1, further comprising, after determining that a parent-child relationship exists between the parent entity and the child entity:
identifying one or more other child entities having an existing parent-child relationship with the parent entity; and
establishing a child-child relationship between the child page and pages associated with the one or more other child entities.

11. The method of claim 1, wherein the parent-child relationship between the parent entity and the child entity is inferred based on information provided by a user associated with the child page.

12. A computer program product comprising a non-transitory computer-readable storage medium containing computer program code for:
obtaining training data that defines mappings between social networking content associated with social networking pages and between entities corresponding to those social networking pages;
accessing a child page in a social networking system, the child page containing content that is associated with a child entity in the social networking system;
identifying a parent page containing content that is associated with a parent entity in the social networking system;
determining, by a computer, that a parent-child relationship exists between the parent and child entities, by:
retrieving a post displayed on the child page,
identifying one or more terms contained in the retrieved post,
comparing, via a machine learning model that is trained using the previously obtained training data, the retrieved one or more terms contained in the post on the child page with the content contained on the identified parent page, and
based on the comparing, determining that a parent-child relationship exists between the parent and child entities;
responsive to the determining, establishing a connection in the social networking system between the child page and the parent page; and
associating at least a portion of the content of the parent page with the child page.

13. The computer program product of claim 12, wherein determining that a parent-child relationship exists between the parent entity and the child entity comprises:
determining, based on the content of the child page that is associated with the child entity, that the child page is associated with a particular category; and
determining, based on the content of the parent page that is associated with the parent entity, that the parent page is associated with the same particular category.

14. The computer program product of claim 12, wherein determining that a parent-child relationship exists between the parent entity and the child entity comprises statistically analyzing collective information obtained from a plurality of users associated with the child page to ascertain an association between the child entity and the parent entity.

15. The computer program product of claim 12, wherein the content of the child page that is associated with the child entity comprises at least one of: a name of the child entity, a photo of the child entity, a link to a webpage associated with the child entity, a comment about the child entity, a user check-in associated with the child entity, a like expressing endorsement toward the child entity, and a location of the child entity.

16. The computer program product of claim 12, further comprising updating the child page based on the portion of the content of the parent page associated with the child page, thereby displaying, on the child page, the portion of the content of the parent page.

17. The computer program product of claim 12, further comprising associating at least a portion of content of the child page with the parent page.

18. The computer program product of claim 12, further comprising updating the parent page based on the portion of the content of the child page associated with the parent page thereby displaying, on the parent page, the portion of the content of the child page.

19. The computer program product of claim 18, wherein the portion of the content of the child page includes a number of likes associated with the child entity.

20. The computer program product of claim 18, wherein the portion of the content of the child page includes a number of check-ins associated with the child entity.

21. The computer program product of claim 12, further comprising, after determining that a parent-child relationship exists between the parent entity and the child entity:
   identifying one or more other child pages having an existing parent-child relationship with the parent page; and
   establishing a child-child relationship between the child page and the one or more other child pages.

22. The computer program product of claim 12, wherein the parent-child relationship between the parent entity and the child entity is inferred based on information provided by a user associated with the child page.

23. The method of claim 1, wherein the identified one or more terms associated with the parent entity comprise one or more terms representative of the parent entity.

24. The computer program product of claim 12, wherein the identified one or more terms associated with the parent entity comprise one or more terms representative of the parent entity.

25. The method of claim 2, wherein:
   the particular category represents a particular topic of interest shared by one or more social networking system users;
   the parent entity and the child entity correspond to instances of the particular topic of interest; and
   the parent page and the child page, associated with the particular category, each provides a communication forum for social networking system users to communicate respectively about the parent entity and the child entity.

26. The method of claim 25, wherein the particular topic of interest shared by the one or more social networking system users is selected from the group consisting of: a business enterprise, a geographic location, a commercial brand, a private figure, a public figure, a form of entertainment, a form of activity, a social cause, and a social community.

\* \* \* \* \*